United States Patent
Park et al.

(10) Patent No.: US 12,252,180 B2
(45) Date of Patent: Mar. 18, 2025

(54) LOWER CROSS MEMBER FOR VEHICLE

(71) Applicants: Hyundai Motor Company, Seoul (KR); Kia Corporation, Seoul (KR); Kolon Spaceworks Co., Ltd., Gyeongsangnam-do (KR)

(72) Inventors: Sang Yoon Park, Seoul (KR); Seung Chan Lee, Gyeonggi-do (KR); Yong Beom Lee, Seoul (KR); Pil Won Kang, Seoul (KR); Hyun Sik Kim, Seoul (KR); Sang Sun Park, Gyeonggi-do (KR); Hee Seouk Chung, Gyeonggi-do (KR); Seung Uk Kang, Gyeonggi-do (KR); Chi Hoon Choi, Gyeonggi-do (KR); Seong Jong Kim, Gyeonggi-do (KR); Dong Won Kim, Gyeonggi-do (KR)

(73) Assignees: Hyundai Motor Company, Seoul (KR); Kia Corporation, Seoul (KR); Kolon Spaceworks Co., Ltd., Gyeongsangnam-do (KR)

( * ) Notice: Subject to any disclaimer, the term of this patent is extended or adjusted under 35 U.S.C. 154(b) by 609 days.

(21) Appl. No.: 17/455,363

(22) Filed: Nov. 17, 2021

(65) Prior Publication Data
US 2022/0379972 A1    Dec. 1, 2022

(30) Foreign Application Priority Data
May 31, 2021  (KR) .......................... 10-2021-0070358

(51) Int. Cl.
*B62D 25/20*    (2006.01)

(52) U.S. Cl.
CPC .................................. *B62D 25/20* (2013.01)

(58) Field of Classification Search
CPC ..................................................... B62D 25/20
See application file for complete search history.

(56) References Cited

U.S. PATENT DOCUMENTS

| 10,384,725 B2 | 8/2019 | Kellner et al. |
| 2014/0110964 A1* | 4/2014 | Schijve ................ B60J 5/0429 29/527.1 |

FOREIGN PATENT DOCUMENTS

| JP | 5153226 B2 | 2/2013 |
| JP | 2015-093315 A | 5/2015 |
| JP | 2016-221868 A | 12/2016 |
| JP | 6276230 B2 | 2/2018 |
| JP | 2018-039247 A | 3/2018 |
| JP | 2018-172116 A | 11/2018 |
| JP | 2019-519395 A | 7/2019 |
| KR | 10-1435193 B1 | 8/2014 |
| KR | 10-2016-0080161 A | 7/2016 |
| KR | 10-1637284 B1 | 7/2016 |
| KR | 10-1685396 B1 | 12/2016 |
| KR | 10-1780568 B1 | 9/2017 |
| KR | 10-1840580 B1 | 3/2018 |

(Continued)

*Primary Examiner* — Catherine A. Simone
(74) *Attorney, Agent, or Firm* — Fox Rothschild LLP

(57) ABSTRACT

A lower cross member for a vehicle is disposed on a floor of a vehicle. The lower cross member includes a core member and a reinforcing layer. The core member is made of a composite material containing 70 wt. % or more of unidirectional carbon fibers, and the reinforcing layer is made of a composite material containing 70 wt. % or more of fiberglass.

9 Claims, 2 Drawing Sheets

(56) References Cited

FOREIGN PATENT DOCUMENTS

| KR | 10-1944870 B1 | 2/2019 |
| KR | 2019-525869 A | 9/2019 |
| KR | 10-2021-0077063 A | 6/2021 |

* cited by examiner

LOWER CROSS MEMBER FOR VEHICLE

CROSS REFERENCE TO RELATED APPLICATION

The present application claims priority to Korean Patent Application No. 10-2021-0070358, filed May 31, 2021, the entire contents of which is incorporated herein for all purposes by this reference.

BACKGROUND

Field of the Disclosure

The present disclosure relates to a lower cross member for a vehicle, and more particularly, to a cross member using a composite material that is lighter in weight than a metallic material.

Description of the Related Art

A cruising range, which is one of the performance elements of an electric vehicle, is an important factor that allows a consumer to decide whether to purchase the electric vehicle. In particular, since a battery-electric vehicle (BEV), which operates using a battery, does not have a separate charging device, unlike a hybrid electric vehicle (HEV) or a fuel-cell electric vehicle (FCEV), the cruising range is a performance element that is particularly important for the BEV while the BEV travels. There are various methods of increasing the cruising range of the BEV, and basically, a large number of batteries need to be mounted to ensure the sufficient cruising range. Accordingly, the electric vehicles mostly have the batteries disposed below passenger compartments of the vehicles.

However, when the battery is disposed at the lower side of the vehicle as described above, there is a risk that a fire occurs due to impact applied to the battery by deformation of a vehicle body in the event of a broadside collision. To avoid the risk, a sufficient collision space needs to be maintained between the battery and a side sill of the vehicle body. However, as the collision space increases, a battery capacity decreases to that extent, which impairs the advantage of the configuration in which the battery is disposed at the lower side of the vehicle. Therefore, the performance related to the broadside collision of the electric vehicle is an important performance factor that serves to protect the passenger, and also ensure the cruising range.

In general, to cope with the broadside collision of the electric vehicle to protect the battery, a basic strategy sets a side sill region as an energy absorbing space and sets the remaining interior space as a safety space, as described below. To effectively cope with the broadside collision, the energy absorbing section needs to be maximally deformed to absorb collision energy, and the contact between the vehicle body and the battery needs to be prevented by minimizing the deformation of the safety space. Accordingly, cross members disposed in the interior of the vehicle need to have sufficiently high strength to prevent deformation in the event of a broadside collision.

The above-mentioned matters described as the background art are provided merely to aid understanding of the background of the present disclosure, and should not be construed to admit that the matters correspond to the technologies already known to those skilled in the art.

SUMMARY

The present disclosure has been made in an effort to provide a lower cross member for a vehicle, which is lightweight, has improved rigidity, and reduces the number of components and processes.

To achieve the above-mentioned object, the present disclosure provides a lower cross member for a vehicle that may include: a core member; and a reinforcing layer formed on a surface of the core member, wherein the core member is made of a composite material containing 70 wt. % or more of unidirectional carbon fiber, and the reinforcing layer is made of a composite material containing 60 wt. % or more of fiberglass.

A cross-sectional shape of the core member may include one or more closed curves. The reinforcing layer may include a lower layer, an upper layer, and an inner layer, the lower layer may be formed on an outer-lower surface of the core member, the upper layer may be formed on an outer-upper surface of the core member, and the inner layer may be formed on an inner surface of the core member.

A thickness ratio between the core member and the lower layer, a thickness ratio between the core member and the upper layer, and a thickness ratio between the core member and the inner layer may be 2.8:1 to 3:1, and a sum of thicknesses of the core member and the lower layer, a sum of thicknesses of the core member and the upper layer, and a sum of thicknesses of the core member and the inner layer may be less than 5.5 t. A ratio in weight between the unidirectional carbon fiber and the fiberglass may be 50:50 to 75:25. The fiberglass may be woven by intersecting at +45 and −45 degrees.

The core member may include: a horizontal portion coupled to an upper side of a lower layer, a reinforcing portion that protrudes from the horizontal portion in an upward direction of a vehicle and having an internal space; and extension portions that extends from front and rear ends of the horizontal portion in a forward-rearward direction of the vehicle, and the upper layer may be shaped to cover the reinforcing portion and the extension portions of the core member.

A support portion may extend between the horizontal portion and the reinforcing portion of the core member in a direction that intersects a direction in which the horizontal portion extends, and the support portion may be shaped to traverse an internal space defined by the horizontal portion and the reinforcing portion. A recessed portion recessed inward may be formed at an upper side of an upper layer or a lower side of a lower layer, and the recessed portion may extend along the upper layer or the lower layer. The lower cross member may include through-holes penetratively formed in a forward-rearward direction of a vehicle, and an extension component that extends in the forward-rearward direction of the vehicle may penetrate the through-holes.

The lower cross member for a vehicle according to the present disclosure has the following effects. The lower cross member according to the present disclosure may have a weight reduced to a level of 10% of a weight of a lower cross member made of a metallic material and incurs a minimal amount of cost due to the use of a composite material. The lower cross member may be prevented from deformation in the event of a broadside collision, which may assuredly protect the safety region and reduce the space required to prepare for the broadside collision. As a result, the battery capacity may be additionally ensured, which makes it possible to increase the cruising range of the electric vehicle.

DETAILED DESCRIPTION OF THE INVENTION

Figure 1:
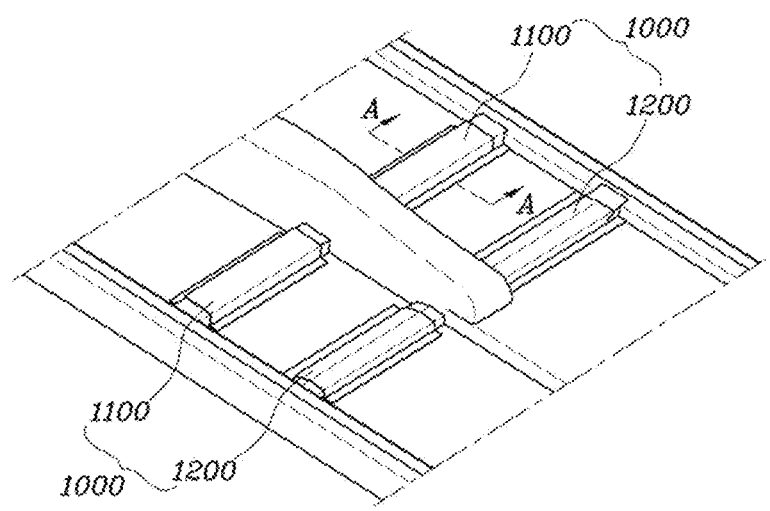
FIG. 1 is a lower cross member according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, specific contents for solving the above-mentioned problems and achieving the above-mentioned object will be described below in detail with reference to the accompanying drawings. Meanwhile, the detailed description of publicly known related technologies in the same field will be omitted when it is determined that the detailed description is not helpful in understanding the subject matter of the present disclosure. The technical spirit of the present disclosure is not limited thereto and may be variously modified and carried out by those skilled in the art.

The present disclosure relates to a structure of a lower cross member for a passenger compartment, which is provided to satisfy performance related to a broadside collision of an electric vehicle (EV) having a battery mounted at a lower side of the vehicle. When a side sill severely penetrates into a passenger compartment in the event of a broadside collision of an electric vehicle, the side sill hits a battery, which causes a serious safety problem such as a fire. In the related art, since the lower cross member for a passenger compartment is made of steel or aluminum, the cross member is deformed and the side sill severely penetrates into the passenger compartment in the event of a broadside collision. Therefore, a space between the battery and the side sill needs to be sufficiently large to protect the battery. However, an absolute size of the battery decreases, which causes a decrease in cruising range of the electric vehicle.

To solve the problem, the present disclosure provides the structure of the lower cross member for a passenger compartment, which may minimize the penetration of the side sill into the passenger compartment in the event of a broadside collision, thereby ensuring broadside collision stability even with the space between the battery and the side sill and maximizing the cruising range of the electric vehicle.

The cruising range, which is one of the performance elements of an electric vehicle, is an important factor that allows a consumer to decide whether to purchase the electric vehicle. In particular, since a battery-electric vehicle (BEV), which operates using a battery, does not have a separate charging device, unlike a hybrid electric vehicle (HEV) or a fuel-cell electric vehicle (FCEV), the cruising range is a performance element that is particularly important for the BEV while the BEV travels. There are various methods of increasing the cruising range of the BEV, and basically, a large number of batteries need to be mounted to ensure the sufficient cruising range. Accordingly, the electric vehicles mostly may have the batteries disposed below passenger compartments of the vehicles.

However, when the battery is disposed at the lower side of the vehicle as described above, there may be a risk that a fire occurs due to impact applied to the battery by deformation of a vehicle body in the event of a broadside collision. To avoid the risk, a sufficient collision space needs to be maintained between the battery and the side sill. However, as the collision space increases, a battery capacity decreases to that extent, which may impair the advantage of the configuration in which the battery is disposed at the lower side of the vehicle.

Therefore, the performance related to the broadside collision of the electric vehicle may be an important performance factor that serves to not only simply protect the passenger, but also ensure the cruising range. To effectively cope with the broadside collision, the energy absorbing section needs to be maximally deformed to absorb collision energy, and the contact between the vehicle body and the battery needs to be prevented by minimizing the deformation of the safety space. Accordingly, cross members disposed in the interior of the vehicle need to have sufficiently high strength to prevent deformation during a broadside collision.

FIG. 1 is a view illustrating lower cross members 1000 according to an embodiment of the present disclosure. Referring to FIG. 1, the lower cross members 100 may include a plurality of front cross members 1100 and a plurality of rear cross members 1200 which are made of the same material and have the same configuration. The front cross member 1100 and the rear cross member 1200 may have the same configuration but have different shapes. Hereinafter, for convenience of description, the front cross member 1200 and the rear cross member are referred to as the lower cross member 1000.

Figure 3:
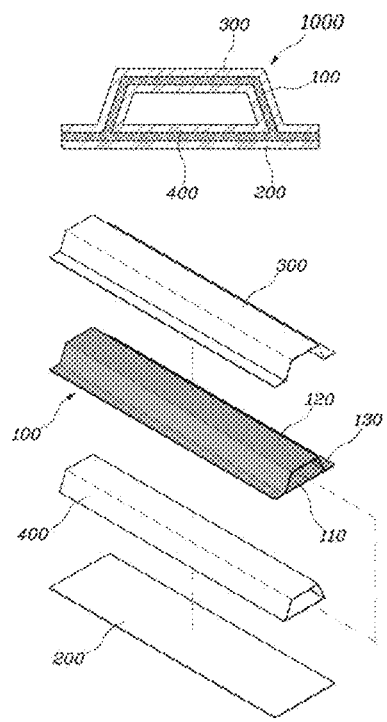
FIG. 3 is an exploded perspective view illustrating the lower cross member according to the embodiment of the present disclosure.

Referring to FIG. 3, the lower cross member 1000 for a vehicle may include a core member 100, and a reinforcing layer L formed on a surface of the core member 100. The reinforcing layer L may include a lower layer 200, an upper layer 300, and an inner layer 400. The lower layer 200 may be formed on an outer-lower surface of the core member 100, the upper layer 300 may be formed on an outer-upper surface of the core member 100, and the inner layer 400 may be formed on an inner surface of the core member 100.

Figure 2:
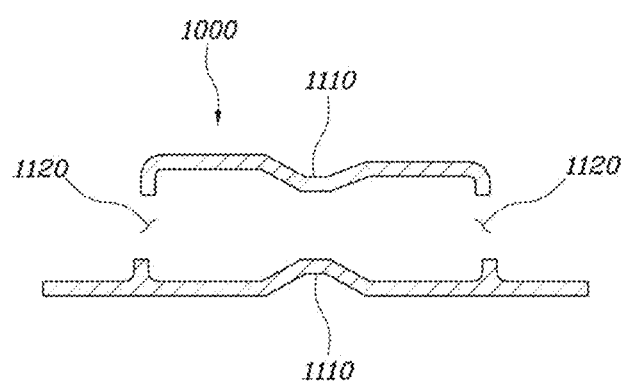
FIG. 2 is a cross-sectional view taken along line A-A in FIG. 1.

As illustrated in FIG. 2, the lower cross member 1000 has through-holes 1120 that penetrate the lower cross member 1000 in a forward-rearward direction of the vehicle. An extension component, which extends in the forward-rearward direction of the vehicle, may pass through an internal space 410 (see FIG. 4), formed in the lower cross member 1000, through the through-holes 1120.

In addition, a recessed portion 1110, which is recessed inward, may be formed at an upper side of the upper layer 300 or a lower side of the lower layer 200. The recessed portion 1110 may more effectively absorb and support a broadside collision. The recessed portion 1110 may be disposed adjacent to a path through which an air conditioning duct, an electric wire, or the like passes through the through-holes 1120.

In addition, referring to FIG. 3, the core member 100 may include a horizontal portion 110 coupled to an upper side of the lower layer 200, a reinforcing portion 120 that protrudes vertically upward from the horizontal portion 110 and having an internal space, and extension portions 130 that extend from front and rear ends of the horizontal portion 110 in the forward-rearward direction of the vehicle. The upper layer 300 may be shaped to cover the reinforcing portion 120 and the extension portions 130 of the core member 100.

The horizontal portion 110 may further extend to prevent the extension portions 130 and the reinforcing portion 120 from moving away from one another in the forward-rearward direction of the vehicle when an external force is applied in the vertical (upward-downward) direction of the vehicle in a state in which the extension portions 130 and the reinforcing portion 120 are coupled to one another.

Figure 4:
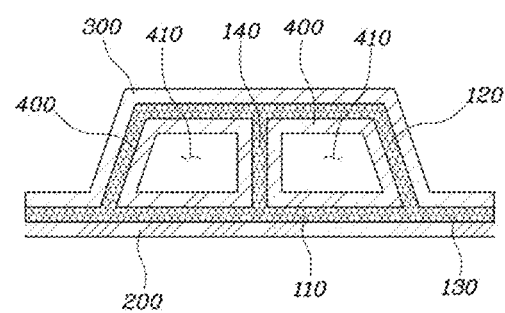
FIG. 4 is a cross-sectional view illustrating the lower cross member according to the embodiment of the present disclosure.

Meanwhile, referring to FIG. 4, a support portion 140 may extend between the horizontal portion 110 and the reinforcing portion 120 of the core member 100 in a direction that intersects a direction in which the horizontal portion 110 extends. The support portion 140 may be shaped to traverse an internal space defined by the horizontal portion 110 and the reinforcing portion 120. One or more closed curves may be formed in the core member 100 by the support portion 140, a plurality of inner layers 400 may be provided, and the plurality of inner layers 400 may be formed on an inner circumferential surface of the core member 100 along the closed curves formed in the cross-section of the core member 100.

Meanwhile, the lower cross member 1000 for a vehicle may include the core member 100, and the reinforcing layer L formed on the surface of the core member 100. The core member 100 may be made of a composite material containing about 70 wt. % or more of unidirectional carbon fibers, and the reinforcing layer L may be made of a composite material containing about 60 wt. % or more of fiberglass.

In the event of a broadside collision of the vehicle, a load in a width direction of the vehicle is mainly generated, but a load in a longitudinal direction of the vehicle is also generated. Therefore, resistance against the loads in the two directions need to be appropriately designed so that the lower cross member 1000 for a vehicle has sufficient strength. In the related art, since the metallic material is isotropic, there is a problem in that strength for each direction is unable to be optimized. To ensure sufficient strength, it is necessary to consider both the resistance against the load in the width direction and the resistance against the load in the longitudinal direction.

The core member 100 may support the load generated in the width direction in the event of a broadside collision of the vehicle and made of the unidirectional carbon fiber as a primary material. To ensure sufficient resistance against the load, the core member 100 needs to be made of a composite material containing about 70 wt. % or more of the unidirectional carbon fibers. In particular, the core member 100 has specific gravity of 1.5 to 1.7 g/cc, tensile strength of 1,800 to 2,500 MPa, and elastic modulus of 130 to 180 GPa and may withstand a significant amount of load generated in the width direction of the vehicle.

With the use of the composite material, the lower cross member may be lighter in weight by about 10% or more than a lower cross member made of a metallic material in the related art. The reinforcing layer L may support the load generated in the width direction and the load generated in the longitudinal direction in the event of a broadside collision of the vehicle. The reinforcing layer L is made of fiberglass as a main material. The fiberglass may be woven by intersecting at +45 and −45 degrees to maximally support the load generated in the longitudinal direction. In order to ensure sufficient resistance against the load, the reinforcing layer L needs to be made of a composite material containing 60 wt. % or more of fiberglass. In particular, the reinforcing layer L may have specific gravity of 1.7 to 2.0 g/cc, tensile strength of 600 to 900 MPa, and elastic modulus of 20 to 35 GPa and may withstand the load generated in the longitudinal direction as well as the load generated in the width direction of the vehicle.

In other words, the reinforcing layer L withstands the load generated in the longitudinal direction and the load generated in the width direction and reinforces the core member 100, thereby preventing a crack from being formed in the core member 100 including the unidirectional carbon fibers. A cross-sectional shape of the core member 100 may include one or more closed curves. This is because the closed cross-sectional shape is excellent in resistance against the load in comparison with an opened cross-sectional shape. Further, since the composite material may be lightweight, the structure having the closed cross-section is lighter in weight than the structure made of steel and having the opened cross-section.

Particularly, a ratio in weight between the unidirectional carbon fiber and the fiberglass may be 50:50 to 75:25. A drop-tower experiment was performed using a product for testing to derive the ratio, a dropping height was 450 mm, and a dropping load was 300 kg. According to the experiment result, when the ratio of the unidirectional carbon fiber exceeds the above-mentioned ratio and is less than 50 and the ratio of the fiberglass is more than 50, the load for withstanding a broadside collision is insufficient. Further, when the ratio of the unidirectional carbon fiber is greater than 75 and the ratio of the fiberglass is less than 25, the cross member 1000 for a vehicle does not sufficiently withstand the load in the vertical direction of the vehicle.

The reinforcing layer L may include the lower layer 200, the upper layer 300, and the inner layer 400. The lower layer 200 may be formed on the outer-lower surface of the core member 100, the upper layer 300 may be formed on the outer-upper surface of the core member 100, and the inner layer 400 may be formed on the inner surface of the core member 100. The core member 100 is made of carbon fibers, thereby inhibiting electric conduction between components of the vehicle body which are made of different materials. To avoid galvanic corrosion, the lower layer 200 may be made of a non-conductive material and arranged below the core member 100.

The inner layer 400 may be arranged on an inner circumferential surface of the core member 100. Similar to the lower layer 200 and the upper layer 300, the inner layer 400 may be configured to withstand the loads generated in the width direction and the longitudinal direction of the vehicle and prevent a crack from being formed in the core member 100. In particular, a thickness ratio of the core member 100 and the lower layer 200, a thickness ratio of the core member 100 and the upper layer 300, and a thickness ratio of the core member 100 and the inner layer 400 may be 2.8:1 to 3:1. A sum of thicknesses of the core member 100 and the lower layer 200, a sum of thicknesses of the core member 100 and the upper layer 300, and a sum of thicknesses of the core member 100 and the inner layer 400 may be less than 5.5 t (t means 'mm'). If the thickness ratio exceeds the above-mentioned ratio and the lower cross member has a large thickness, there is a high likelihood that the fiber is unable be sufficiently impregnated with other substances during the process of manufacturing the composite material containing the unidirectional carbon fiber and the fiberglass, and the completely manufactured cross member is unable to exhibit the function thereof.

The lower cross member for a vehicle according to the present disclosure may have a weight reduced to a level of 10% of a weight of a lower cross member made of a metallic material and incurs a minimal amount of cost since a composite material is applied. The lower cross member is prevented from deformation during a broadside collision, which may assuredly protect the safety region and reduce the space required to prepare for the broadside collision. As a result, the battery capacity may be additionally ensured, which makes it possible to increase the cruising range of the electric vehicle.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. A lower cross member for a vehicle, the lower cross member, comprising:
   a core member; and
   a reinforcing layer formed on a surface of the core member,
   wherein the core member is made of a composite material containing 70 wt. % or more of unidirectional carbon fiber, and the reinforcing layer is made of a composite material containing 60 wt. % or more of fiberglass,
   wherein the reinforcing layer includes a lower layer, an upper layer, and an inner layer, the lower layer is formed on an outer-lower surface of the core member, the upper layer is formed on an outer-upper surface of the core member, and the inner layer is formed on an inner surface of the core member.

2. The lower cross member of claim 1, wherein a cross-sectional shape of the core member includes one or more closed curves.

3. The lower cross member of claim 1, wherein a thickness ratio between the core member and the lower layer, a thickness ratio between the core member and the upper layer, and a thickness ratio between the core member and the inner layer are 2.8:1 to 3:1, and a sum of thicknesses of the core member and the lower layer, a sum of thicknesses of the core member and the upper layer, and a sum of thicknesses of the core member and the inner layer are less than 5.5 t.

4. The lower cross member of claim 1, wherein a ratio in weight between the unidirectional carbon fiber and the fiberglass is 50:50 to 75:25.

5. The lower cross member of claim 1, wherein the fiberglass is woven by intersecting at +45 and −45 degrees.

6. The lower cross member of claim 1, wherein the core member includes:
   a horizontal portion coupled to an upper side of a lower layer, a reinforcing portion protruding from the horizontal portion in an upward direction of a vehicle and having an internal space; and
   extension portions extending from front and rear ends of the horizontal portion in a forward-rearward direction of the vehicle, and
   wherein the upper layer is shaped to cover the reinforcing portion and the extension portions of the core member.

7. The lower cross member of claim 6, wherein a support portion extends between the horizontal portion and the reinforcing portion of the core member in a direction that intersects a direction in which the horizontal portion extends, and the support portion is shaped to traverse an internal space defined by the horizontal portion and the reinforcing portion.

8. The lower cross member of claim 1, wherein a recessed portion recessed inward is formed at an upper side of an upper layer or a lower side of a lower layer, and the recessed portion extends along the upper layer or the lower layer.

9. The lower cross member of claim 1, further comprising through-holes penetratively formed in a forward-rearward direction of a vehicle, and an extension component extending in the forward-rearward direction of the vehicle penetrates the through-holes.

* * * * *